US012573831B2

(12) United States Patent
Kim et al.

(10) Patent No.: US 12,573,831 B2
(45) Date of Patent: Mar. 10, 2026

(54) LIGHTNING ROD WITH ELECTRIC DOUBLE LAYER AND ELECTRIC DIPOLE MOMENT TYPE DISCHARGE AMPLIFICATION FUNCTION

(71) Applicant: SUNKWANG LIGHTNING PROTECTION TECHNICAL INSTITUTE INC., Seoul (KR)

(72) Inventors: Dong-Jin Kim, Seoul (KR); Wan-Sung Kwon, Seoul (KR); Sang-Won Seo, Seoul (KR); Yeong-Sin Park, Gyeonggi-do (KR); Sung-Joon Lee, Seoul (KR); Jae-Sang Yoo, Seoul (KR)

(73) Assignee: SUNKWANG LIGHTNING PROTECTION TECHNICAL INSTITUTE INC., Seoul (KR)

( * ) Notice: Subject to any disclaimer, the term of this patent is extended or adjusted under 35 U.S.C. 154(b) by 116 days.

(21) Appl. No.: 18/518,388

(22) Filed: Nov. 22, 2023

(65) Prior Publication Data

US 2024/0097425 A1     Mar. 21, 2024

(51) Int. Cl.
| | |
|---|---|
| *H02G 13/00* | (2006.01) |
| *H01T 4/02* | (2006.01) |
| *H01T 19/00* | (2006.01) |

(52) U.S. Cl.
CPC .............. *H02G 13/80* (2013.01); *H01T 4/02* (2013.01); *H01T 19/00* (2013.01); *H02G 13/40* (2013.01)

(58) Field of Classification Search
CPC .......... H02G 13/80; H02G 13/40; H01T 4/02; H01T 19/00
See application file for complete search history.

(56) References Cited

U.S. PATENT DOCUMENTS

| | | | |
|---|---|---|---|
| 2005/0061525 A1* | 3/2005 | Chung ................... | H02G 13/80 174/3 |
| 2008/0023210 A1* | 1/2008 | Park ....................... | H02G 13/80 174/3 |
| 2017/0045216 A1* | 2/2017 | Chung ................... | H02G 13/40 |

FOREIGN PATENT DOCUMENTS

KR           100998316        12/2010

* cited by examiner

*Primary Examiner* — Pete T Lee
(74) *Attorney, Agent, or Firm* — IPLA P.A.

(57) ABSTRACT

A lightning rod with an electric double layer and electric dipole moment type discharge amplification function, the lightning rod including: a support member (100) for moving a lightning current to the ground; an emission member (200) fitted to the support member (100) to collect charges of the ground according to the approach of a thundercloud and thus emit a large number of ions with the opposite polarity to the polarity of the thundercloud; ground charge chargers (300) fitted to the support member (100) and having spaces formed therein to charge the charges of the ground; an insulation member (400) disposed on top of the emission member (200); and discharge induction members (500) fixedly disposed on top and underside of the emission member (200) by means of the insulation member (400).

5 Claims, 3 Drawing Sheets

LIGHTNING ROD WITH ELECTRIC DOUBLE LAYER AND ELECTRIC DIPOLE MOMENT TYPE DISCHARGE AMPLIFICATION FUNCTION

CROSS REFERENCE

The present application claims the benefit of Korean Patent Application No. 10-2022-0116862 filed in the Korean Intellectual Property Office on 16 Sep. 2022, the entire contents of which are incorporated herein by reference.

BACKGROUND

The present disclosure relates to a lightning rod with an electric double layer and electric dipole moment type discharge amplification function that is capable of accumulating a lot of charges of the ground to emit a large number of ions with the opposite polarity to the polarity of a thundercloud, thereby inducing fast discharge to quickly lower an atmospheric electric field.

Generally, if a thundercloud happens, an electric field on a top peak of a building increases, and as the thundercloud approaches, streamers are emitted due to the electrical breakdown caused by a potential difference.

A conventional lightning rod is installed on a building on the ground, and when a thundercloud increases, the lightning rod performs corona discharge by means of a lightning rod protrusion to emit charges, so that lightning is induced to the ground.

Recently, studies of improved lightning rods capable of inducing lightning to the ground at a fast speed to protect a building from the lightning have been consistently made.

The background of the present disclosure is disclosed in Korean Patent No. 10-0998316 (Dated on Nov. 29, 2010).

SUMMARY OF THE DISCLOSURE

Accordingly, the present disclosure has been made in view of the above-mentioned problems occurring in the related art, and it is an object of the present disclosure to provide a lightning rod with an electric double layer and electric dipole moment type discharge amplification function that is capable of accumulating a lot of charges of the ground to emit a large number of ions with the opposite polarity to the polarity of a thundercloud, thereby inducing fast discharge to quickly lower an atmospheric electric field.

To accomplish the above-mentioned object, according to the present disclosure, there is provided a lightning rod with an electric double layer and electric dipole moment type discharge amplification function, the lightning rod including: a support member for moving a lightning current to the ground; an emission member fitted to the support member to collect charges of the ground according to the approach of a thundercloud and thus emit a large number of ions with the opposite polarity to the polarity of the thundercloud; ground charge chargers fitted to the support member in such a way as to be spaced apart from each other in up and down directions with respect to the emission member and having spaces formed therein to charge the charges of the ground; an insulation member disposed on top of the emission member; and discharge induction members fixedly disposed on top and underside of the emission member by means of the insulation member to accumulate the charges of the ground charged in the ground charge chargers in number to the same polarity as the polarity of the thunderclouds and thus induce the discharge of the accumulated charges.

According to the present disclosure, desirably, the support member may include: a shaft extending up and down long; a protruding piece connected to top of the shaft; a connection shaft connected to underside of the shaft in such a way as to be connected to the ground to move the lightning current to the ground; and a coupling unit fitted to the shaft in such a way as to pressurize the ground charge chargers and restrain the discharge induction members.

According to the present disclosure, desirably, the shaft may have a plurality of fixing grooves spaced apart from one another along the outer peripheries of the upper and lower portions thereof, the emission member may have a through hole adapted to pass the shaft therethrough and mounting holes radially spaced apart from one another on the outside of the through hole, and each discharge induction member may have the shape of a triangle with protrusions formed on a base and a vertex thereof, the protrusion formed on the base of the discharge induction member being fitted to the corresponding mounting hole of the emission member, and the protrusion formed on the vertex of the discharge induction member being fitted to the corresponding fixing groove of the shaft.

According to the present disclosure, desirably, the shaft may have screw shafts protruding from top and underside thereof, and the coupling unit may include: insulating and restraining members fitted to the screw shafts located on top and underside of the shaft in such a way as to support the ground charge chargers and insulatedly restrain the discharge induction members; and nuts coupled to the screw shafts of the shaft in such a way as to pressurize the ground charge chargers supported against the insulating and restraining members.

According to the present disclosure, desirably, the shaft may have screw grooves formed on the end portions of the screw shafts, the protruding piece may have a screw shaft located on the underside thereof in such a way as to be coupled to the screw groove of the screw shaft located on top of the shaft, and the connection shaft may have a screw shaft disposed on top thereof in such a way as to be coupled to the screw groove of the screw shaft located on underside of the shaft.

BRIEF DESCRIPTION OF THE DRAWINGS

The above and other objects, features and advantages of the present disclosure will be apparent from the following detailed description of the preferred embodiments of the disclosure in conjunction with the accompanying drawings, in which.

DETAILED DESCRIPTION OF THE PREFERRED EMBODIMENTS

Hereinafter, the present disclosure will be described in detail with reference to the accompanying drawings.

Figure 1:
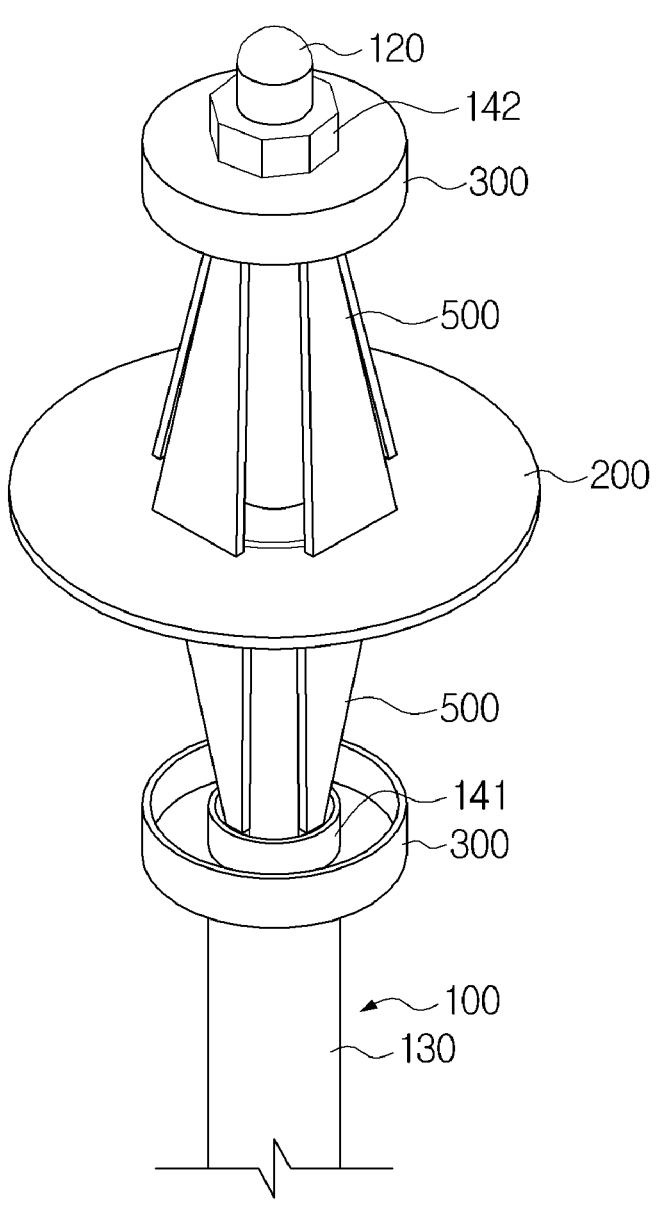
FIG. 1 is a perspective view showing a lightning rod with an electric double layer and electric dipole moment type discharge amplification function according to the present disclosure.
Figure 2:
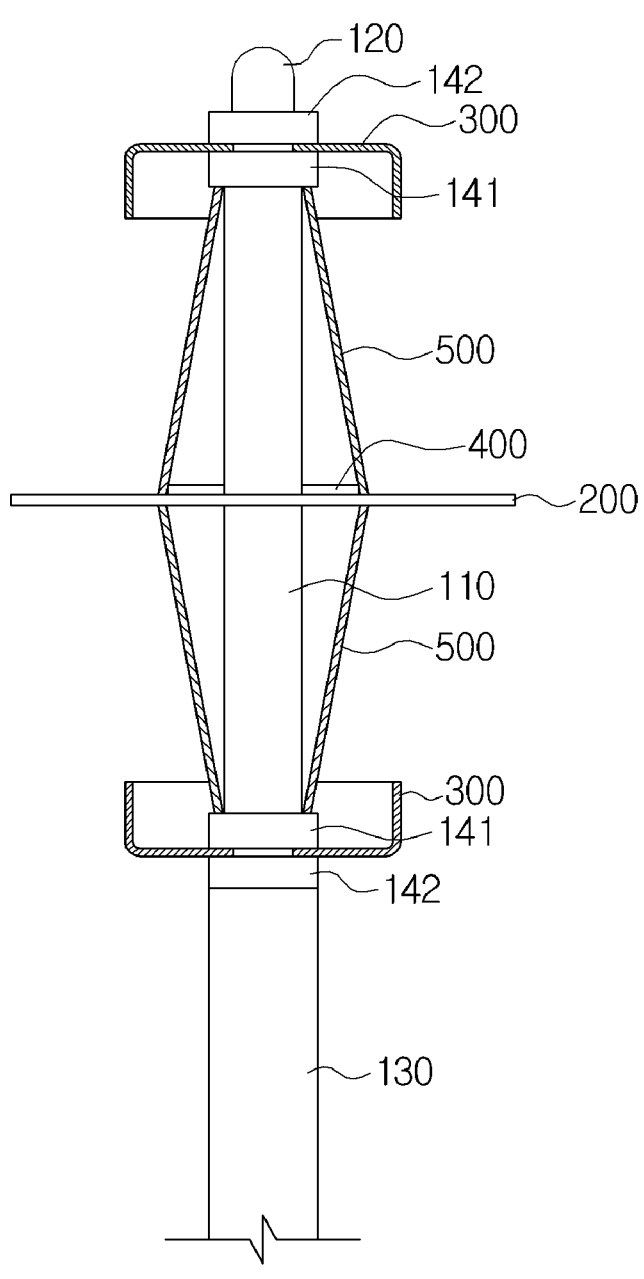
FIG. 2 is a sectional view showing the lightning rod according to the present disclosure.
Figure 3:
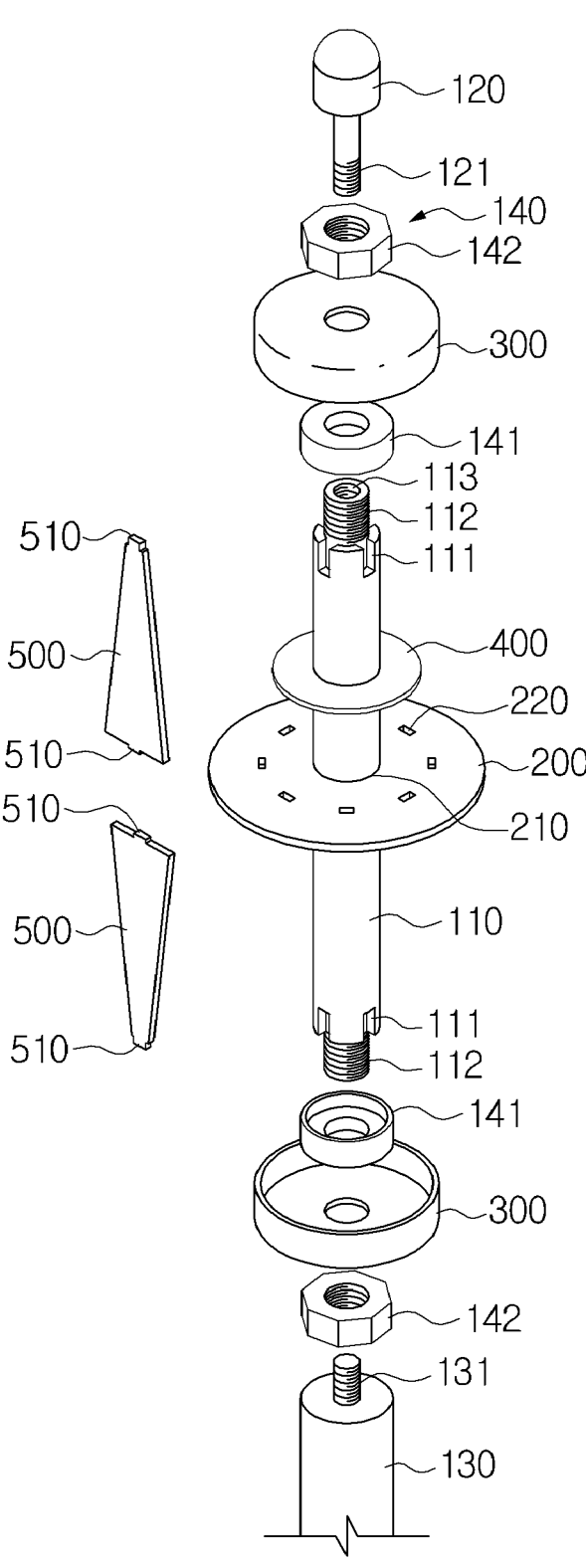
FIG. 3 is an exploded perspective view showing the configuration of the lightning rod according to the present disclosure.

As shown in FIGS. 1 to 3, a lightning rod with an electric double layer and electric dipole moment type discharge amplification function according to the present disclosure includes: a support member 100 for moving a lightning current to the ground; an emission member 200 fitted to the support member 100 to collect charges of the ground according to the approach of a thundercloud and thus emit a large number of ions with the opposite polarity to the polarity of the thundercloud; ground charge chargers 300 fitted to the support member 100 in such a way as to be spaced apart from each other in up and down directions with respect to the emission member 200 and having spaces formed therein to charge the charges of the ground; an insulation member 400 disposed on top of the emission member 200; and discharge induction members 500 fixedly disposed on top and underside of the emission member 200 by means of the insulation member 400 to accumulate the charges of the ground charged in the ground charge chargers 300 in number to the same polarity as the polarity of the thunderclouds and thus induce the discharge of the accumulated charges.

The support member 100 is made of a metal material and connected to the ground to move a lightning current generated when lightning happens to the ground. In this case, if a thundercloud approaches, the support member 100 is charged to the opposite polarity to the polarity of the thundercloud by means of an electric dipole moment. That is, in the case of the thundercloud of negative polarity, the support member 100 is positively charged, and contrarily, in the case of the thundercloud of positive polarity, the support member 100 is negatively charged. Hereinafter, an explanation will be given under the assumption of the thundercloud of negative polarity.

Further, the support member 100 includes a shaft 110 extending up and down long, a protruding piece 120 connected to top of the shaft 110, a connection shaft 130 connected to underside of the shaft 110 in such a way as to be connected to the ground to allow the lightning current to move to the ground, and a coupling unit 140 fitted to the shaft 110 in such a way as to pressurize the ground charge chargers 300 and restrain the discharge induction members 500.

The shaft 110 has a plurality of fixing grooves 111 spaced apart from one another along the outer peripheries of the upper and lower portions thereof, screw shafts 112 protruding from top and underside thereof, and screw grooves 113 formed on the end portions of the screw shafts 112.

The protruding piece 120 is a conductive tip that is rounded on the end thereof to induce corona discharge of a positive charge formed when an electric field strength of the surface of the ground increases over 5 kV/m through the formation of a thundercloud, and the conductive tip is made of a metal such as stainless steel resistant to a thermal strength. Further, the protruding piece 120 has a screw shaft 121 located on the underside thereof. The screw shaft 121 of the protruding piece 120 is coupled to the screw groove 113 of the screw shaft 112 located on top of the shaft 110. In this case, if the screw shaft 121 of the protruding piece 120 is coupled to the screw groove 113, the protruding piece 120 pressurizes a nut 142 fitted to top of the shaft 110 to prevent the nut 142 from being unfastened from the shaft 110.

The protruding piece 120 is a start point where an upward streamer is generated by the corona discharge of the positive charge, and if lightning is transferred from the thundercloud to the protruding piece 120, the protruding piece 120 moves the lightning current from the surface thereof.

The connection shaft 130 is fixed to a structure or building in such a way as to be connected to the ground and has a screw shaft 131 disposed on top thereof. The screw shaft 131 is coupled to the screw groove 113 of the screw shaft 112 located on underside of the shaft 110. If the screw shaft 131 of the connection shaft 130 is coupled to the screw groove 113, the connection shaft 130 pressurizes a nut 142 fitted to underside of the shaft 110 to prevent the nut 142 from being unfastened from the shaft 110.

The coupling unit 140 includes insulating and restraining members 141 fitted to the screw shafts 112 located on top and underside of the shaft 110 in such a way as to support the ground charge chargers 300 and insulatedly restrain the discharge induction members 500 and the nuts 142 coupled to the screw shafts 112 of the shaft 110 in such a way as to pressurize the ground charge chargers 300 supported against the insulating and restraining members 141.

Each insulating and restraining member 141 is made of a synthetic resin or rubber material and has a through hole formed up and down to pass through the screw shaft 112 of the shaft 110 in such a way as to be supportedly locked onto the ends of the fixing grooves 111 and a groove formed on the underside thereof to restrainedly insert the ends of the discharge induction members 500.

The nuts 142 are coupled to the screw shafts 112 of the shaft 110 in such a way as to pressurize the ground charge chargers 300 thereagainst, and accordingly, the ground charge chargers 300 are supportedly fixed to the insulating and restraining members 141. In this case, the insulating and restraining members 141 pressurized by the nuts 142 serve to restrain the discharge induction members 500.

The emission member 200 is fitted to the support member 100 and collects charges of the ground according to the approach of the thundercloud to emit a large number of ions with the opposite polarity to the polarity of the thundercloud. In this case, the emission member 200 is made of a metal material and has the shape of a disc, and further, the emission member 200 has a through hole 210 adapted to pass the shaft 110 therethrough and mounting holes 220 radially spaced apart from one another on the outside of the through hole 210.

The emission member 200 is negatively charged in the same way as the support member 100.

The ground charge chargers 300 are smaller in size than the emission member 200 and are spaced apart from each other in up and down directions with respect to the emission member 200 to increase the surface area with atmosphere, thereby efficiently inducing the discharge of the discharge induction members 500. Further, the ground charge chargers 300 are negatively charged in the same way as the support member 100 and the emission member 200.

The insulation member 400 is made of a synthetic resin or rubber material and has a through hole formed up and down to pass the shaft 110 therethrough. Further, the insulation member 400 has the shape of a disc having a smaller diameter than the emission member 200 and comes into close contact with top of the emission member 200.

The discharge induction members 500 are formed of a plurality of metal plates and negatively charged by means of the insulation member 400. Each discharge induction member 500 has the shape of a triangle with protrusions 510 formed on a base and a vertex thereof. In this case, the discharge induction member 500 desirably has the shape of an isosceles triangle. Accordingly, the protrusion 510 formed on the base of the discharge induction member 500 is fitted to the corresponding mounting hole 220 of the emission member 200, and the protrusion 510 formed on the vertex of the discharge induction member 500 is fitted to the corresponding fixing groove 111 of the shaft 110.

Like this, the discharge induction members 500 fixed to top of the emission member 200 are radially spaced apart from one another at given intervals, and the respective vertexes of the discharge induction members 500 are fixed to the shaft 110, so that the discharge induction members 500 have an overall narrow-up and wide-down shape.

Further, the discharge induction members 500 fixed to underside of the emission member 200 are located to the opposite direction to the discharge induction members 500 fixed to top of the emission member 200 and thus have an overall wide-up and narrow-down shape. Accordingly, an electric double layer is formed by means of the discharge induction members 500 located on top and underside of the emission member 200.

In this case, if the discharge induction members 500 located on top of the emission member 200 are fixed to the mounting holes 220 at odd number positions, the discharge induction members 500 located on underside of the emission member 200 are fixed to the mounting holes 220 at even number positions.

Like this, electrical breakdown occurs owing to the air gaps between the discharge induction members 500 and the insulation member 400, and accordingly, a large number of ions are emitted from the end of the emission member 200 to form electrostatic dissipative space charges in the atmosphere, so that an atmospheric electric field is lowered to protect a structure or building from lightning.

As described above, the lightning rod with the electric double layer and electric dipole moment type discharge amplification function according to the present disclosure is configured to accumulate a lot of charges of the ground so that it emits a large number of ions with the opposite polarity to the polarity of a thundercloud, thereby inducing fast discharge to quickly lower an atmospheric electric field.

In addition, the lightning rod with the electric double layer and electric dipole moment type discharge amplification function according to the present disclosure is configured to perform the corona discharge before the charges move up so that no potential difference exists to avoid the occurrence of lightning, thereby protecting the structure or building from lightning.

While the present disclosure has been described with reference to the particular illustrative embodiments, it is not to be restricted by the embodiments but only by the appended claims. It is to be appreciated that those skilled in the art can change or modify the embodiments without departing from the scope and spirit of the present disclosure.

What is claimed is:

1. A lightning rod with an electric double layer and electric dipole moment type discharge amplification function, the lightning rod comprising:
   a support member (100) for moving a lightning current to the ground;
   an emission member (200) fitted to the support member (100) to collect charges of the ground according to the approach of a thundercloud and thus emit a large number of ions with the opposite polarity to the polarity of the thundercloud;
   ground charge chargers (300) fitted to the support member (100) in such a way as to be spaced apart from each other in up and down directions with respect to the emission member (200) and having spaces formed therein to charge the charges of the ground;

an insulation member (400) disposed on top of the emission member (200); and
discharge induction members (500) fixedly disposed on top and underside of the emission member (200) by means of the insulation member (400) to accumulate the charges of the ground charged in the ground charge chargers (300) in number to the same polarity as the polarity of the thunderclouds and thus induce the discharge of the accumulated charges.

2. The lightning rod according to claim 1, wherein the support member (100) comprises:
   a shaft (110) extending up and down long;
   a protruding piece (120) connected to top of the shaft (110);
   a connection shaft (130) connected to underside of the shaft (110) in such a way as to be connected to the ground to move the lightning current to the ground; and
   a coupling unit (140) fitted to the shaft (110) in such a way as to pressurize the ground charge chargers (300) and restrain the discharge induction members (500).

3. The lightning rod according to claim 1, wherein the shaft (110) has a plurality of fixing grooves (111) spaced apart from one another along the outer peripheries of the upper and lower portions thereof, the emission member (200) has a through hole (210) adapted to pass the shaft (110) therethrough and mounting holes (220) radially spaced apart from one another on the outside of the through hole (210), and each discharge induction member (500) has the shape of a triangle with protrusions (510) formed on a base and a vertex thereof, the protrusion (510) formed on the base of the discharge induction member (500) being fitted to the corresponding mounting hole (220) of the emission member (200), and the protrusion (510) formed on the vertex of the discharge induction member (500) being fitted to the corresponding fixing groove (111) of the shaft (110).

4. The lightning rod according to claim 3, wherein the shaft (110) has screw shafts (112) protruding from top and underside thereof, and
   the coupling unit (140) comprises:
   insulating and restraining members (141) fitted to the screw shafts (112) located on top and underside of the shaft (110) in such a way as to support the ground charge chargers (300) and insulatedly restrain the discharge induction members (500); and
   nuts (142) coupled to the screw shafts (112) of the shaft (110) in such a way as to pressurize the ground charge chargers (300) supported against the insulating and restraining members (141).

5. The lightning rod according to claim 1, wherein the shaft (110) has screw grooves (113) formed on the end portions of the screw shafts (112), the protruding piece (120) has a screw shaft (121) located on the underside thereof in such a way as to be coupled to the screw groove (113) of the screw shaft (112) located on top of the shaft (110), and the connection shaft (130) has a screw shaft (131) disposed on top thereof in such a way as to be coupled to the screw groove (113) of the screw shaft (112) located on underside of the shaft (110).

* * * * *